G. CLEMENTS & J. M. HOSTLER.
AIR PURIFYING APPARATUS.
APPLICATION FILED DEC. 17, 1906.
961,208.
Patented June 14, 1910.
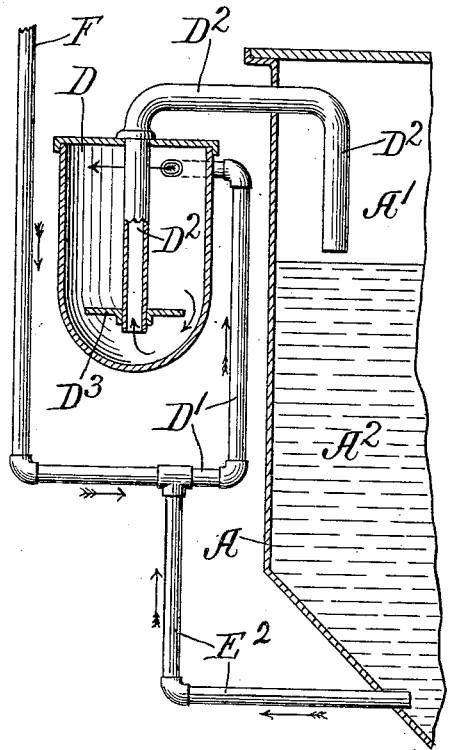
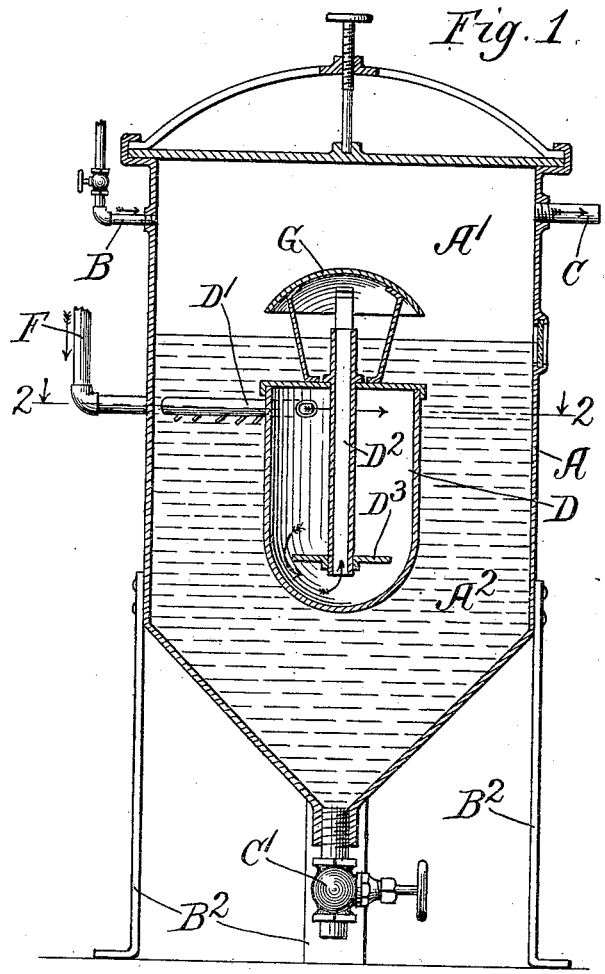
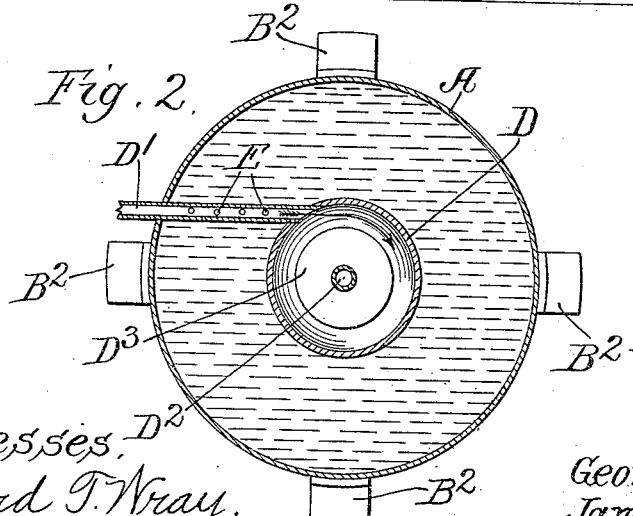
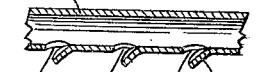
Witnesses.
Edward T. Wray.
Abbie E. Johnson.
Inventors.
George Clements
James W. Hostler
by Parker Carter
Attorneys.

UNITED STATES PATENT OFFICE.

GEORGE CLEMENTS AND JAMES M. HOSTLER, OF CHICAGO, ILLINOIS, ASSIGNORS TO HYGENIC RENOVATING COMPANY, OF CHICAGO, ILLINOIS, A CORPORATION OF ILLINOIS.

AIR-PURIFYING APPARATUS.

961,208.  Specification of Letters Patent.  Patented June 14, 1910.

Application filed December 17, 1906. Serial No. 348,125.

*To all whom it may concern:*

Be it known that we, GEORGE CLEMENTS and JAMES M. HOSTLER, citizens of the United States, residing at Chicago, in the county of Cook and State of Illinois, have invented a certain new and useful Improvement in Air-Purifying Apparatus, of which the following is a specification.

Our invention relates to air washing devices particularly designed for use in connection with pneumatic cleaning and ventilating systems.

It is illustrated in the accompanying drawings wherein—

Figure 1 is a vertical section, Fig. 2 is a cross section on the line 2—2 of Fig. 1, Fig. 3 a vertical section through a part of a modified form, and Fig. 4 a detail of pipe.

Like parts are indicated by the same letter in all the figures.

A is a tank suitably supported at $B^2$ $B^2$ and containing an air space $A^1$ and a water space $A^2$. Into the upper part of the tank opens the water supply pipe B and from the upper part of the tank issues the air withdrawing pipe C. In the lower part of the tank is the blow-off valve $C^1$.

D is a mixing chamber which may be placed inside the air or water tank or outside the same and either above or below the water line as convenience may dictate. This chamber has opening into it the mixing or inlet pipe $D^1$ and opening out of it the outlet pipe $D^2$. It also preferably contains a baffle plate $D^3$. The inlet pipe preferably opens into the mixing chamber so as to direct its supply current of mixed water and air and dust tangentially into the mixing chamber or so as to set up a whirl therein. The baffle plate is designed to assist and encourage the rotary action of the materials discharged into the mixing chamber by compelling them to pass to the outlet pipe $D^2$ from along the inside of the inclosing walls of the chamber. The air and water are thus compelled to travel a long and circuitous course together. These various pipes may be arranged in any desired manner but we prefer them substantially as shown and the baffle plate $D^3$ may be omitted if desired. The water supply may be derived from any source but obviously the natural source is the water contained in the water tank. We have shown three means by which this water may be taken from the water tank and furnished to the mixing pipe through which it passes into the mixing chamber, and either or any two or more of these means might be employed simultaneously or separately from the others, and other connections might easily be devised to accomplish the same result. We show first a series of openings in the pipe $D^1$ indicated at E E, and provided with the vanes $E^3$.

The air supply pipe we indicate by the letter F. It is supposed to lead from, for example, some cleaning instrument to the pipe $D^1$. The discharge pipe $D^2$ in the case of the construction shown in Fig. 1 preferably discharges into an air chamber against the baffle plate G, though it might be arranged in any other desired manner, the object being to facilitate the separation of the air from the water and to permit the air to pass freely to the opening into the pipe C and the water charged with the dust and the like to be discharged freely into the water chamber. In Fig. 3 this pipe $D^2$ is shown as turned down toward and discharging near the surface of the water in the water tank.

These devices in ordinary practice are often mounted upon wagons where economy and convenience in the arrangement of the several parts are of great importance, hence we have shown some modifications. If it is desired to have as little as possible in the way of apparatus inside the water chamber, the pipe $E^2$ as shown in Fig. 1 or Fig. 3, may be used. In this latter connection some such pipe is important because the chamber itself lies outside of the water tank. It is, of course, not necessary that the mixing chamber be in the water chamber or air chamber or below the surface of water in the water chamber. It is only necessary that the arrangement be such that its supply pipe will receive an adequate supply of water. It will be understood, therefore, that the proportion, construction and arrangement of the several parts may be greatly altered without departing from the spirit of our invention and that the illustrations are to be taken in a large sense as diagrammatic. It will also be understood, as explained above, that some of the elements used may be dispensed with, and particularly that some of the devices for supplying water to the pipe $D^2$ may be omitted.

It will be understood that the parts may be made of any desired material. We have sometimes made the mixing chamber of glass so that the operation can be seen.

The use and operation of our invention are as follows: It will be understood, of course, that there is in operation some device which supplies air which is to be washed to the air pipe F and that there is a pump or other suction device connected with the pipe C whereby a circulation of the contaminated air through the washer is maintained. This, of course, is no part of our invention but it is simply mentioned as suggesting its use. Assuming such a plan in operation and the parts connected as proposed, it is evident with the starting of the pump or other suction device there will be a tendency of the air to pass through the pipe F, pipe $D^1$, through mixing chamber out of pipe $D^2$ into air chamber and out of pipe C. It is equally evident that this will induce a flow of water from the water chamber into pipe $D^1$, either by way of the holes E E or pipe $E^1$ or pipe $E^2$ or other connections, as the case may be. This water flowing into the pipe $D^1$ is, of course, mixed with the contaminated air and the current of fluid is discharged preferably tangentially into the mixing chamber. Under the influence of this tangential discharge and the baffle plate $D^3$, such current of fluid will circulate rapidly around the inclosing wall of the mixing chamber and will eventually pass out into the pipe $D^2$. Here the water which, on account of such mixing, has taken up the impurities, is discharged into the water chamber and the purified air into the air chamber, whence it passes out to the point of discharge or use, as the case may be. In conclusion we may say that the air moves through the air supply-pipe to the mixing pipe where it is mixed with water. The mixed fluid passes through the mixing pipe preferably tangentially, into the mixing chamber where it is circulated and mixed preferably by the air of the baffle plate and whence it is discharged so that the water passes to the water chamber and the air to the air chamber whence the latter is discharged through the air discharge pipe. Any water supply way furnishes water to the mixing pipe.

We claim:

1. In an air purifying apparatus, the combination of a single compartment mixing chamber with a pipe for introducing impure air and water thereinto at one end, opening tangentially thereinto and another pipe for leading the same therefrom at the other end, and an air and water chamber with which said two pipes are connected, the induction pipe being connected with such water chamber from a point below the water level.

2. In an air purifying apparatus, the combination of a single compartment mixing chamber with a pipe for introducing impure air and water thereinto at one end, opening tangentially thereinto and another pipe for leading the same therefrom at the other end, and a centrally disposed baffle plate in said chamber between the two pipe openings, and an air and water chamber with which said two pipes are connected, the induction pipe being connected with such water chamber from a point below the water level.

3. In an air purifying apparatus, the combination of a single compartment mixing chamber with a pipe for introducing impure air and water thereinto at one end, opening tangentially thereinto and another pipe for leading the same therefrom at the other end, and an air and water chamber with which said two pipes are connected, the induction pipe being connected with such water chamber from a point below the water level, said mixing chamber contained in said air and water chamber.

4. In an air purifying apparatus, the combination of a single compartment mixing chamber with a pipe for introducing impure air and water thereinto at one end, opening tangentially thereinto and another pipe for leading the same therefrom at the other end, and a centrally disposed baffle plate in said chamber between the two pipe openings, and an air and water chamber with which said two pipes are connected, the induction pipe being connected with such water chamber from a point below the water level, said mixing chamber contained in said air and water chamber.

5. An air purifying apparatus comprising a tank partially filled with water and having an air space thereabove a mixing chamber submerged in the water, a suction pipe communicating with the mixing chamber for the flow of the impure air thereinto, said pipe being submerged in the water and provided with inlets for the introduction of water to commingle with the air, a discharge pipe leading from the mixing chamber into the air space above the level of the body of water, and a baffle plate disposed within said mixing tank for forcing the discharging current of air downwardly against the surface of the water.

6. An air purifying apparatus comprising a tank having water and air containing spaces, one below the other, a mixing chamber submerged in the body of water therein, an impure air conducting pipe leading into said chamber, through the body of water and provided with a series of inlet openings and coöperating inclined vanes, and a discharge pipe leading from the bottom of the mixing chamber upwardly through the same and the water, and communicating with the air space.

7. An air purifying apparatus comprising a tank having water and air containing spaces, one below the other, a mixing chamber submerged in the body of water, an impure air conductor leading into said chamber through the body of water and provided with water inlets, a discharge pipe extending upwardly through the mixing chamber and communicating with the air space above the body of water, and a curved baffle plate disposed above said pipe and adapted to retard and deflect the discharging currents of air against the surface of the water.

8. An air purifying apparatus comprising a tank having upper and lower air and water containing spaces, a mixing chamber disposed in the body of water, said chamber comprising a vessel having a cylindrical body and a curved bottom, an impure air conducting pipe leading into the tank through the body of water and connected with the mixing chamber at the upper end and one side thereof, said pipe being provided with water inlets, a discharge pipe extending upwardly through the mixing chamber from a point adjacent to the base thereof to a point above the level of the body of water, and a baffle plate arranged above said pipe to deflect the discharging current of air against the surface of the water.

9. An air purifying apparatus comprising a casing having a space for the reception of a body of water and an air space above the same, said air space being provided with a purified air outlet, a mixing chamber within the water containing space provided with an outlet extending above the water level into the air space, and an impure air conductor leading through the casing into the mixing chamber within the water containing space and provided with inlets for the entrainment of water with the entering current of air.

10. An air purifying apparatus comprising a casing having a drain outlet at its lower end and a body of water in the lower portion thereof, the upper portion of the casing above the body of water forming an air space, an outlet leading from said air space, a mixing chamber submerged in the body of water and provided with a rounded bottom and a discharge tube leading upward from a point adjacent said bottom to the air space, a baffle plate disposed above said tube and adapted to deflect the current discharging therefrom downward and an impure air conducting pipe leading through the water into the top of the mixing chamber tangentially thereto, said pipe being provided with water inlets and coöperating vanes, the latter being inclined reversely to the direction of flow of the air current.

11. An air purifying apparatus comprising a casing having a space for the reception of a body of water, an air space above the same, said air space being provided with a purified air outlet, a mixing chamber within the water containing space provided with an outlet extending above the water level into the air space, and an impure air conductor leading from the exterior of the casing through the water containing space into the mixing chamber, said conductor being provided with water inlets and coöperating vanes, said vanes being inclined reversely to the direction of flow of the entering current of air.

GEORGE CLEMENTS.
JAMES M. HOSTLER.

Witnesses:
  Percival H. Truman,
  Francis W. Parker.